(12) United States Patent
Gentil et al.

(10) Patent No.: US 10,050,489 B2
(45) Date of Patent: Aug. 14, 2018

(54) BRUSH-HOLDER FOR A MOTOR VEHICLE STARTER PROVIDED WITH A THERMAL PROTECTION SYSTEM, AND CORRESPONDING MOTOR VEHICLE STARTER

(71) Applicant: VALEO EQUIPEMENTS ELECTRIQUES MOTEUR, Creteil (FR)

(72) Inventors: Maximilien Gentil, Corbas (FR); Marie-Ange Nalin, Chazey sur Ain (FR); Julie Gouges, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 220 days.

(21) Appl. No.: 15/107,625

(22) PCT Filed: Jan. 15, 2015

(86) PCT No.: PCT/FR2015/050099
§ 371 (c)(1),
(2) Date: Jun. 23, 2016

(87) PCT Pub. No.: WO2015/110743
PCT Pub. Date: Jul. 30, 2015

(65) Prior Publication Data
US 2016/0336832 A1 Nov. 17, 2016

(30) Foreign Application Priority Data

Jan. 23, 2014 (FR) .................................. 14 50573

(51) Int. Cl.
*H02K 5/14* (2006.01)
*H02K 23/18* (2006.01)
(Continued)

(52) U.S. Cl.
CPC ............. *H02K 5/148* (2013.01); *H01R 39/59* (2013.01); *H02K 11/25* (2016.01); *H02K 11/27* (2016.01); *H02K 23/18* (2013.01); *H02K 23/66* (2013.01)

(58) Field of Classification Search
CPC ........ H01R 39/59; H02K 23/18; H02K 23/66; H02K 5/14; H02K 5/148; H02K 11/00;
(Continued)

(56) References Cited

U.S. PATENT DOCUMENTS 6,188,154 B1 2/2001 Luedtke et al.
8,633,621 B2 1/2014 Muhl et al.
(Continued)

FOREIGN PATENT DOCUMENTS

DE     10059680      6/2002
DE     202010002664 U1  7/2011
(Continued)

*Primary Examiner* — Tran Nguyen
(74) *Attorney, Agent, or Firm* — Berenato & White, LLC

(57) ABSTRACT

A brush-holder for a motor vehicle starter comprising at least one first electrically conductive cage receiving a first brush having a first polarity, at least one second cage receiving a second brush having a second polarity different to the first polarity, at least one support plate on which the first cage and the second cage are attached, the support plate being electrically connected to the second polarity, and a deformable heat-sensitive member that is deformable from a pre-defined temperature, wherein the deformable member is arranged so as to electrically insulate the first cage relative to the support plate and wherein it further comprises a means for moving the first cage or the support plate in such a way as to establish contact between the first cage and the support plate following a deformation of the deformable member.

20 Claims, 3 Drawing Sheets

(51) Int. Cl.
*H02K 23/66* (2006.01)
*H01R 39/59* (2006.01)
*H02K 11/25* (2016.01)
*H02K 11/27* (2016.01)

(58) Field of Classification Search
CPC .... H02K 11/0047; H02K 11/25; H02K 11/27; H02K 11/40; H02K 13/00; H02K 13/006; H01H 37/76; H01H 37/767
See application file for complete search history.

(56) References Cited

U.S. PATENT DOCUMENTS

| 9,590,476 | B2 | * | 3/2017 | Gentil | H02K 23/66 |
|---|---|---|---|---|---|
| 2005/0029895 | A1 | * | 2/2005 | Neidhart | A63H 29/22 |
| | | | | | 310/239 |
| 2007/0108864 | A1 | * | 5/2007 | Suzuki | H01R 39/381 |
| | | | | | 310/239 |
| 2014/0184032 | A1 | | 7/2014 | Gentil et al. | |

FOREIGN PATENT DOCUMENTS

| DE | 102010030870 | | 1/2012 | | |
|---|---|---|---|---|---|
| EP | 2317632 | * | 5/2011 | ........... | H02R 39/381 |
| FR | 2977408 | | 1/2013 | | |

* cited by examiner

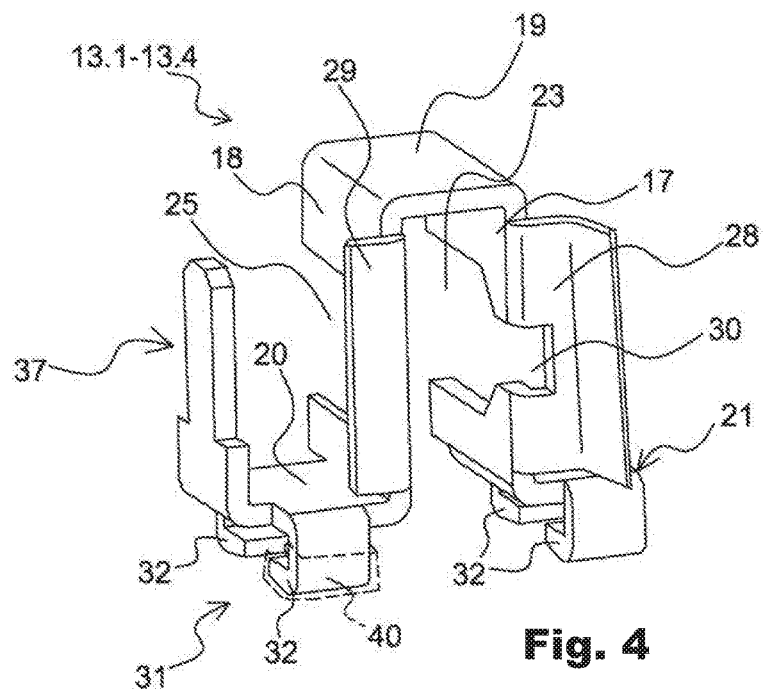
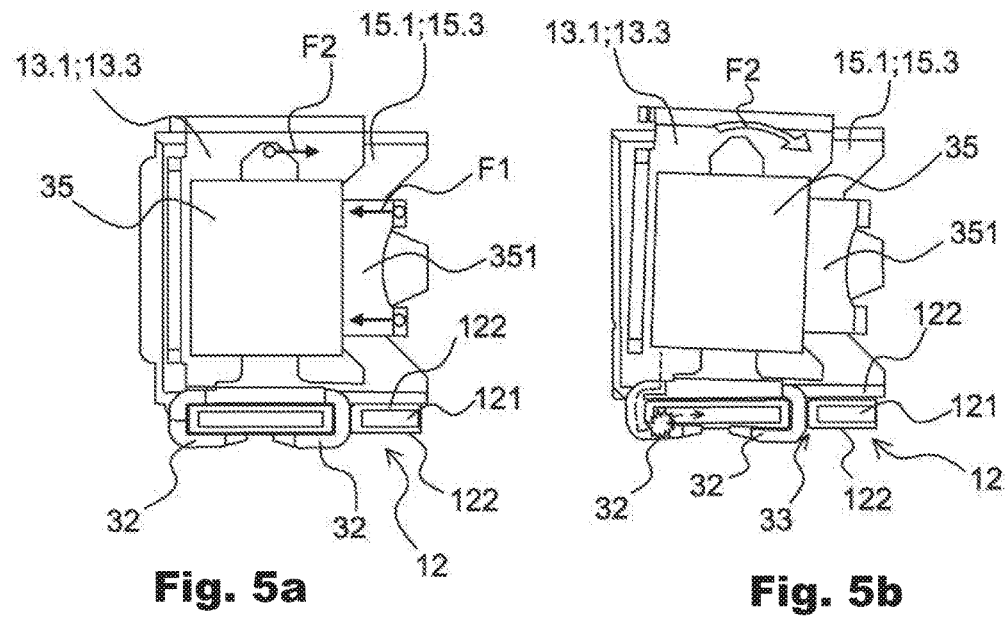

BRUSH-HOLDER FOR A MOTOR VEHICLE STARTER PROVIDED WITH A THERMAL PROTECTION SYSTEM, AND CORRESPONDING MOTOR VEHICLE STARTER

CROSS-REFERENCE TO RELATED APPLICATIONS AND CLAIM TO PRIORITY

This application is a national stage application of International Application No. PCT/FR2015/050099 filed Jan. 15, 2015, which claims priority to French Patent Application No. 1450573 filed Jan. 23, 2014, the disclosures of which are incorporated herein by reference and to which priority is claimed.

FIELD Of THE INVENTION

The invention relates to a brush-holder fur a motor vehicle starter provided with a thermal protection system, as well as to the corresponding starter. The invention has a particularly advantageous, but not exclusive application with the starters of so-called stop and start systems which make it possible to stop and restart the thermal engine of the vehicle in particular according to the traffic conditions.

BACKGROUND OF THE INVENTION

In a known manner, starters comprise a means for protection against excessive current in the form, of one or more electric fuses and/or one or more circuit breakers. FIG. 1 thus shows an example of a starter motor 1 comprising a fuse 2 fitted in series between a supply terminal 3 of the electrical machine 1 and windings 4.1, 4.2, 4.3, 4.4 of the stator of the said motor.

The fuse is designed to blow in order to cut off the electrical supply of the motor when a predetermined maximum current passes through it. This makes it possible to avoid damaging the starter or its environment because of the heat produced by an excess current. Excess current of this type occurs in particular in the case when the rotation of the rotor of the motor is blocked.

When the machine is running unloaded or with a low load (i.e. when it is functioning at between approximately 0 and 25% of the nominal load), the unloaded speed of rotation of the rotor also gives rise to heating of the electrical machine which can damage the starter throughout the duration. This heating, which is causing particular by the mechanical friction between the brushes and the collector, occurs fur example during a phase of excess speed when the pinion of the starter which is driven by the thermal engine rotates faster than the shaft which is driven by the rotor of the starter. However, in these cases, the current which passes through the fuse can be too low to give rise to blowing of the fuse 2, even for a long duration.

A solution would therefore consist of selecting a fuse which can blow both when a no-load current passes through the fuse for a duration which exceeds a first predetermined duration, and when a current passes through the rotary electrical machine which has its rotor blocked for a duration which exceeds a second predetermined duration. Fuses of this type are however far more voluminous than a fuse of a standard size, which makes it virtually impossible to integrate them in the starter.

Document FR2977408 describes a compact thermal protection system 5 which makes it possible to cut off the electrical supply of the motor in the two aforementioned cases (in the case of blocking and in the case of functioning with a low load). For this purpose, this system 5 comprises a heat-sensitive unit and a contact blade which, after deformation of the heat-sensitive unit, can establish a short-circuit between a positive polarity to which the positive brushes 6.1, 6.2 are connected, and the casing 7 of the starter which is connected to the earth with the brushes 6.3 and 6.4. However, a thermal protection system of this type involves the creation of new parts, the fitting of which inside the brush cages is relatively complex to carry out.

SUMMARY OF THE INVENTION

The objective of the invention is to eliminate this disadvantage efficiently by proposing a brush-holder for a motor vehicle starter comprising at least one first electrically conductive cage which receives a first brush with a first polarity, at least one second cage which receives a second brush with a second polarity different from the first polarity, at least one support plate on which the first and the second cages are secured, the said support plate being connected electrically to the second polarity, and a heat-sensitive unit which is deformable starting front a predetermined temperature, characterised in that the said deformable unit is designed to insulate the said first cage electrically relative to the said support plate, and in that it additionally comprises a means for displacement of the said first cage or the said support plate, such as to establish a contact between the said first cage and the said support plate further to deformation of the said deformable unit.

Thus, the invention makes it possible to establish a short-circuit between the brush cage with the first polarity and the support plate which is connected to the second polarity, in order to activate the thermal protection means in the case of overheating, without having to add an additional pan inside the brush cages. This therefore facilitates the assembly of the brush-holder assembly.

According to one embodiment, the said deformable unit is constituted by at least one insulating layer which covers at least partly a metal plate of the said support plate.

According to one embodiment, the said insulating layer is over-moulded on the said metal plate.

According, to one embodiment, the said deformable unit is formed by a layer of electrically insulating material covering at least partly a system for securing the said first cage on the said support plate.

According to one embodiment, the securing system comprises at least one lug which is covered at least partly by a layer of electrically insulating material.

According to one embodiment, the said means for displacement is formed by a spiral spring which is fitted on a system for retention of the said spring belonging to the said first cage.

According to one embodiment, the retention system is constituted by a pin obtained from a wall of the said first cage.

According to one embodiment, the said deformable unit is made of a plastic material.

According to one embodiment, the plastic material is a thermoplastic material such as a polyamide PA 4.6 or PA 6.6, or a PPS polypropylene filled with between 40 and 50% glass fibre.

According to one embodiment, the plastic material is a heat-setting material.

According to one embodiment, the said brush-holder comprises two brushes with a first polarity and two brushes with a second polarity.

According to one embodiment, the first polarity corresponds to a positive polarity, whereas the second polarity to which the said support plate is connected electrically corresponds to an earth of the starter.

The invention also relates to a motor vehicle starter comprising an electric motor provided with a brush-holder according to the invention.

According to one embodiment, the starter comprises a fuse which is connected electrically directly or by means of one or more coils to the first cage, and the fuse is designed to blow and cut off the electrical supply of the rotor when the first cage is in electrical contact with the said support plate further to a deformation of the said deformable unit.

The invention also relates to a brush-holder for a starter of a motor vehicle, comprising at least one first electrically conductive cage which receives a first brush with a first polarity, at least one second cage which receives a second brush with a second polarity different from the first polarity, at least one support plate on which the first and the second cages are secured, the said support plate being connected electrically to the second polarity, and a heat-sensitive unit which is deformable starting from a predetermined temperature, characterised in that the said deformable unit is designed to insulate the said first cage electrically relative to the said support plate, and in that, further to deformation of the said deformable unit, contact is established between the said first cage and the said support plate.

According to one embodiment, the brush-holder additionally comprises a means for displacement of the said first cage or of the said support plate, such as to establish the contact further to the deformation.

The other characteristics previously described can also be added to this invention.

BRIEF DESCRIPTION OF THE DRAWINGS

The invention will be better understood by reading the following description and examining the figures which accompany it. These figures are provided purely by way of non-limiting illustration of the invention.

FIG. 4 shows a view in perspective of a brush cage used with the brush-holder according to the present invention;

FIGS. 5a and 5b are side views of a brush cage and of the support plate, respectively before and after the deformation of an insulating layer covering the support plate.

Elements which are identical, similar or analogous retain the same reference from one figure to another.

DETAILED DESCRIPTION OF THE PREFERRED EMBODIMENTS

Figure 3A:
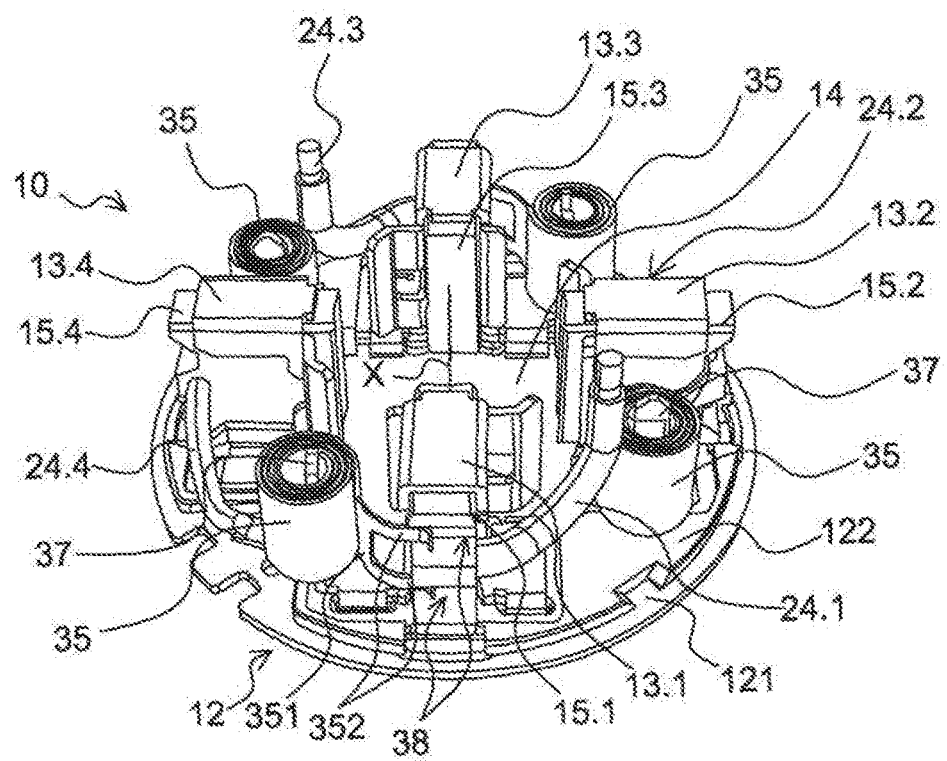
FIGS. 3a and 3b show respectively views in perspective and from below of a brush-holder according to the present invention.

FIG. 3a shows a brush-holder 10 according to the invention for a motor vehicle starter. This brush-holder 10 comprises a support plate 12 with a substantially annular form on which a set of cages 13.1-13.4 are secured, each acting as a receptacle for a brush 15.1-15.4. An axis X of the support plate 12 corresponds to the axis of the brush-holder 10.

Figure 1:
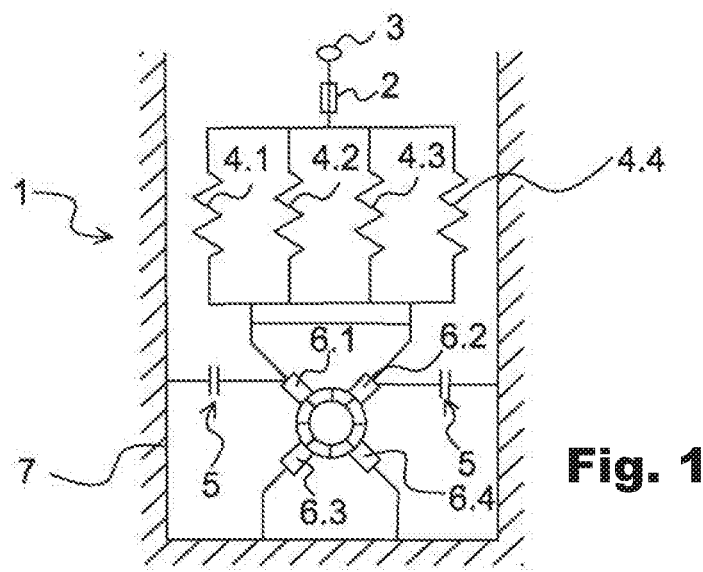
FIG. 1, already described, represents a process diagram of an electric motor of a motor vehicle starter provided with a means for thermal protection.
Figure 2A:
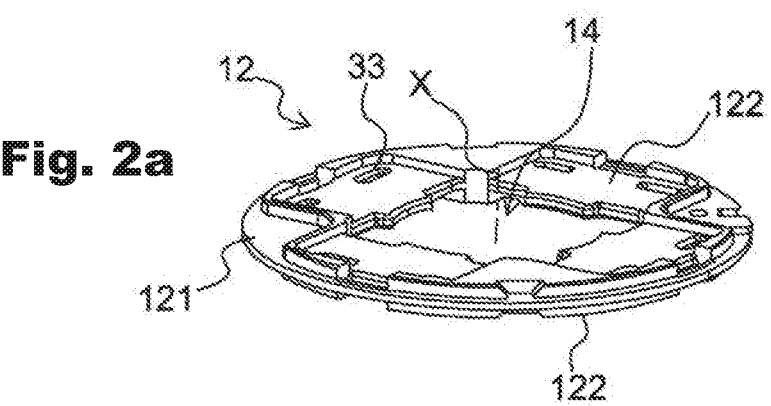
FIGS. 2a and 2b are representations in perspective of the support plate of the brush-holder according to the present invention, according to two different viewing angles.
Figure 2B:
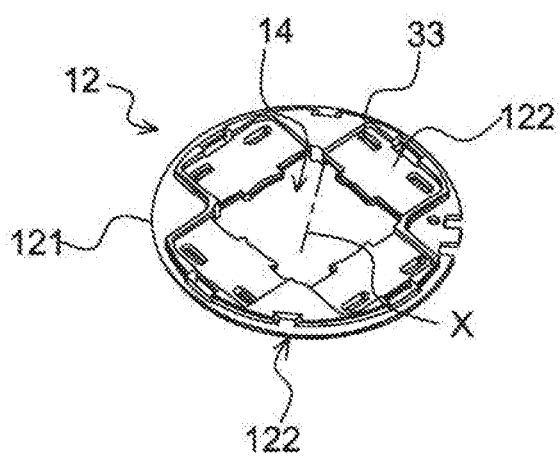

As can be seen clearly in FIGS. 2a and 2b, the support plate 12 is a part in a single piece comprising a metal plate 121 and over-moulded layers 122 provided on both sides of the metal plate 121. The over-moulded layers 122 are made of a plastic material which ensures good electrical insulation. The over-moulded layers 122 protect at least partly the support face of brushes, as well as the opposite face. The over-moulded layers 122 cover all the areas at risk of the plate 12, i.e. all the areas where a short-circuit could occur.

The over-moulded layers 122 are heat-sensitive and deformable starting from a predetermined temperature. The predetermined temperature corresponds to a temperature beyond which the starter and/or its environment would be liable to be damaged.

Different plastic materials can be used according to the applications and the constraints which are imposed on them. Typically, the plastic material which is used for the over-moulded layers 122 is a thermoplastic material such as a polyamide PA 4.6 or PA 6.6, or a PPS polypropylene filled with between 40 and 50% glass fibre. Heat-setting materials can also be envisaged. The metal plate 121 is typically obtained by drawing from a steel to be cut, such as, for example, $FePO_5$.

The support plate 12 and the cages 13.1-13.4 that it supports are secured on a cover (not represented) which forms a rear bearing for the rotor shaft of the electrical machine. In addition, the central part of the plate 12 comprises an orifice 14 via which the assembly which it forms with the brush cages 13.1-13.4 and the brushes 15.1-15.4 is fitted around the rotor shaft of the starter.

Each brush 15.1-15.4 is fitted such as to slide inside a cage 13.1-13.4 which is open on the axis X side in order to allow the brushes 15.1-15.4 to be put into electrical contact with blades which are supported by a collector of a rotor of an electrical machine (not represented).

More specifically, as can be seen clearly in FIG. 4, each cage 13.1-13.4 is produced by bending a small thin metal plate, such as to form substantially an omega, the end branches of which are secured on the plate 12. Each cage 13.1-13.4 thus comprises two opposite parallel lateral walls 17, 18, which are connected to one another by an upper wall 19. The end walls 20, 21 corresponding to the branches of the omega are obtained from the lower edges of the lateral walls 17, 18 of the brush cage 13.1-13.4. One of the lateral walls 17 has a cut-out 23 in order to permit the passage of the braid 24.1-24.4 of the brush accommodated in the corresponding cage 13.1-13.4. The other lateral wall 18 has an opening 25 in order to permit the passage of the arm of the corresponding spring. On the side of the Thee which opens onto the collector side, each brush cage 13.1-13.4 can comprise shutters 28, 29 which extend on both sides of the brush, in order to prevent dust generated by the friction with the blades of the collector from detracting from the functioning of the brush-holder 10. One of the shutters 28 has a hollow 30 situated in the extension of the cut-out 23, in order to permit the passage of the braid 24.1-24.4 as close as possible to the collector.

Figure 3B:
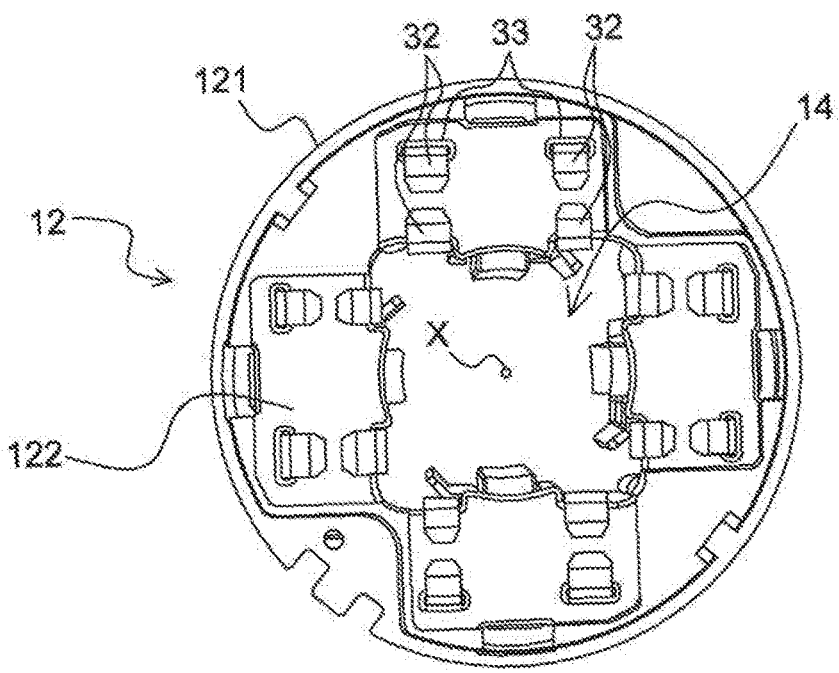

Each cage 13.1-13.4 additionally comprises a system 31 for securing on the plate 12. Each securing system 31 is formed by two pairs of lugs 32. The lugs 32 of each pair are obtained from two opposite edges of the end walls 20, 21. As can be seen in FIG. 3b, a lug 32 of each pair passes through the plate 12 from one side to the other via an opening 33 provided in its thickness. The other lug 32 of each pair is supported against a side of the inner contour with a square form which delimits the orifice 14. The lugs 32 of each pair are folded back towards one another against the plate 12.

Alternatively, the securing system 31 comprises at least one rivet which passes through the plate 12 and an end wall 20, 21 of the brush cage.

In addition, a spiral spring 35 which is associated with each cage 13.1-13.4 thrusts the corresponding brush 15.1-15.4 radially towards contact blades of the collector which are supported by a body of the collector made of electrically insulating material, such as plastic material. Each spring 35 is in this case fitted around a retention system 37, in this case formed by a pin which extends axially relative to the axis X. This pin 37 is obtained by bending one of the end walls 20 of each cage 13.1-13.4.

As can be seen in FIG. 3a, each spring 35 comprises a wound part formed by a plurality of turns. The wound part ends in an arm 351 which is designed to be supported against at least part of the rear face of the brush 15.1-15.4. In this case, the area 351 ends in two parts 352 which are in contact against support faces 38 situated on both sides of the area of securing of the electrically conductive braid 24.1-24.4 on the brush. The area of securing between the braid 24.1-24.4 and the brush 15.1-15.4 is recessed relative to the support faces 38, in order to maximise a functional distance of use of the brushes 15.1-15.4.

The brushes 15.1-15.4 have alternating polarities. Thus, the brushes 15.1 and 15.3 with a positive polarity are connected electrically via their respective braid 24.1, 24.3 to a supply wire obtained from the contactor of the starter. These brushes 15.1 and 15.3 and their corresponding cue 13.1 and 13.3 are insulated electrically against the negative polarity for good functioning of the starter. This insulation is obtained by the over-moulded layers 122 which cover the fields of the openings 33 receiving the lugs of the cages with positive polarity 13.1, 13.3, as well as at least partly the inner contour of the plate 12. The braids 24.1 and 24.3 can also be covered with an insulating sheath.

In addition, the brushes 15.2 and 15.4 with negative polarity which are designed for the current return are connected electrically to the earth of the machine by means of their respective braid 24.2, 24.4 welded on the plate 121. The flexible braids 24.1-24.4 are advantageously made of copper or copper alloy, in order to facilitate the welding on the plate 121. Preferably, the openings 33 which receive the lugs 32 of the cages with negative polarity 13.2 and 13.4, as well as the areas of the inner contour of the plate 12 in contact with other lugs 32 of these cages 13.2, 13.4, are not insulated electrically, such that an electrical contact can intervene between the cages with negative polarity 13.2, 13.4 and the plate 121 via the lugs 32. This contact is not detrimental to the functioning of the starter, since it participates in the establishment of electrical contact between the parts which are designed to be at the same potential, in this case the earthing potential in this application.

A description is provided hereinafter with reference to FIGS. 5a and 5b of the activation of the fuse 2 of the starter in the case of overheating, in order to ensure its protection.

In normal functioning, i.e. when the temperature of deformation of the over-moulded layers 122 has not yet been reached, the lugs 32 of the cages 13.1, 13.3 with positive polarity are insulated against the plate 12, whereas the spring 35 which is fitted compressed applies a force F1 against the brush 15.1, 15.3, such as to keep it constantly in contact with the blades of the collector. In reaction, the spring 35 also applies a force F2 on the cage 13.1, 13.3 via the retention system 37. However, the cages 13.1 and 13.3 cannot be displaced relative to the plate 12 because of the rigid nature of the assembly.

When overheating occurs, caused for example by unloaded functioning of the starter for a long time, the deformation temperature of the insulating layers 122 is reached. The reaction force F2 which is exerted by the spring 35 on the retention system 37 then generates pivoting of the cages with positive polarity 13.1 and 13.3 relative to the plate 12, such that at least one lug 32 of a cage 13.1, 13.3 comes into contact with the plate 121 which is connected to the earth, in order to establish a short-circuit. This short-circuit generates a considerable increase in the current passing through the machine, which has the effect of blowing the fuse 2 of the starter. The invention thus makes it possible to ensure protection of the starter, whereas the current which passes through the machine during unloaded functioning of the motor, giving rise to overheating, does not normally make it possible to blow the fuse 2.

It will be appreciated that persons skilled in the art will be able to modify the configuration of the brush-holder 10 previously described without departing from the context of the invention. Thus, as a variant, as can be seen in FIG. 4, the lugs 32 of the cages with positive polarity 13.1, 13.3 are covered at least partly by a heat-sensitive insulating layer 40. This layer 40 which forms a deformable unit can be produced front the same type of material as that of the over-moulded layers 122.

Alternatively, it is the plate 12 which is displaced towards the cages with positive polarity 13.1, 13.3 further to deformation of the insulating layers 122. Alternatively, the plate 12 is connected electrically to the positive polarity.

As a variant, the layers 122 take the form of added-on insulating washers which are secured on both skies of the metal plate 121. The spiral spring 35 can also be replaced by a cylindrical spring supported on the cover, in order to thrust the corresponding brush against the blades of the collector.

As a variant, the brush-holder 10 comprises more than four brushes 15.1-15.4, each brush being able for example to be associated with another brush positioned on the opposite side of the plate 12.

In this case, the brush-bolder 10 is a brush-holder of a motor vehicle starter machine. As a variant, the brush-holder 10 could also belong to an alternator or an alternator-starter.

The invention claimed is:

1. Brush-holder (10) for a motor vehicle starter comprising at least one first electrically conductive cage (13.1, 13.3) which receives a first brush (15.1, 15.3) with a first polarity, at least one second cage (13.2, 13.4) which receives a second brush (15.2, 15.4) with a second polarity different from the first polarity, at least one support plate (12) on which the first (13.1, 13.3) and the second (13.2, 13.4) cages are secured, said support plate (12) being connected electrically to the second polarity, and a heat-sensitive deformable unit (122, 40) that is deformable starting from a predetermined temperature, wherein said heat-sensitive deformable unit (122, 40) is designed to insulate said first cage (13.1, 13.3) electrically relative to said support plate (12), and wherein further deformation of said heat-sensitive deformable unit (122, 40) enable a contact is established between said first cage (13.1, 13.3) and said support plate (12).

2. Brush-holder according to claim 1, comprising a means (35) for displacement of said first cage or said support plate, such as to establish the contact further to the deformation.

3. Brush-holder according to claim 1, wherein said heat-sensitive deformable unit is constituted by at least one insulating layer (122) which covers at least partly a metal plate (121) of said support plate (12).

4. Brush-holder according to claim 1, wherein said insulating layer (122) is over-moulded on said metal plate (121).

5. Brush-holder according to claim 1, wherein said heat-sensitive deformable unit is formed by a layer (40) of electrically insulating material covering at least partly a system (31) for securing said first cage (13.1, 13.3) on said support plate (12).

6. Brush-holder according to claim 5, wherein securing system (31) comprises at least one lug (32) which is covered at least partly by a layer (40) of electrically insulating material.

7. Brush-holder according to claim 2, wherein said means (35) for displacement is formed by a spiral spring which is fitted on a system (37) for retention of said spring (35) belonging to said first cage (13.1, 13.3).

8. Brush-holder according to claim 7, wherein said retention system (37) is constituted by a pin obtained from a wall of said first cage (13.1, 13.3).

9. Brush-holder according to claim 1, wherein said heat-sensitive deformable unit (122, 40) is made of a plastic material.

10. Brush-holder according to claim 9, wherein the plastic material is a thermoplastic material such as a polyamide PA 4.6 or PA 6.6, or a PPS polypropylene filled with between 40 and 50% glass fibre.

11. Brash-holder according to claim 10, wherein the plastic material is a heat-setting material.

12. Brush-holder according to claim 1, wherein it comprises two brushes (15.1, 15.3) with a first polarity and two brushes (15.2, 15.4) with a second polarity.

13. Brush-holder according to claim 1, wherein the first polarity corresponds to a positive polarity, whereas the second polarity to which said support plate (12) is connected electrically corresponds to an earth of the starter.

14. Motor vehicle starter comprising an electric motor provided with a brush-holder (10) according to claim 1.

15. Brush-holder according to claim 2, wherein said heat-sensitive deformable unit is constituted by at least one insulating layer (122) which covers at least partly a metal plate (121) of said support plate (12).

16. Brush-holder according to claim 2, wherein said insulating layer (122) is over-moulded on said metal plate (121).

17. Brush-holder according to claim 3, wherein said insulating layer (122) is over-moulded on said metal plate (121).

18. Brush-holder according to claim 2, wherein said heat-sensitive deformable unit is formed by a layer (40) of electrically insulating material covering at least partly a system (31) for securing said first cage (13.1, 13.3) on said support plate (12).

19. Brush-holder according to claim 3, wherein said means (35) for displacement is formed by a spiral spring which is fitted on a system (37) for retention of the said spring (35) belonging to he said first cage (13.1, 13.3).

20. Brush-holder according to claim 4, wherein said means (35) for displacement is formed by a spiral spring which is fitted on a system (37) for retention of the said spring (35) belonging to the said first cage (13.1, 13.3).

* * * * *